Figure 1:
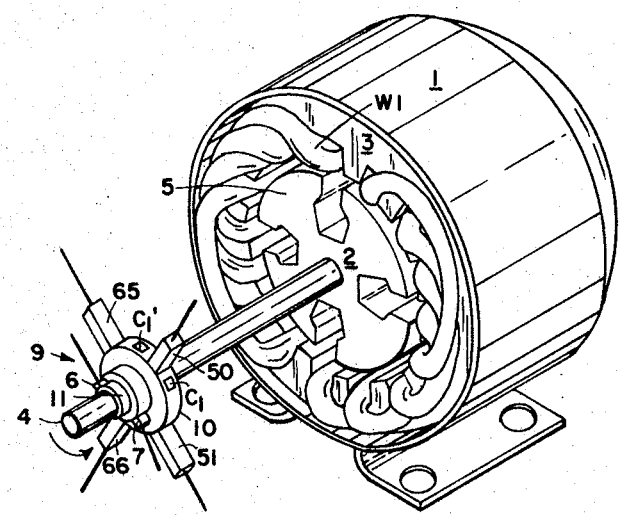

Jan. 17, 1967 V. I. JOHANNES 3,299,336
DYNAMOELECTRIC MACHINE HAVING SOLID STATE COMMUTATION
Filed June 9, 1964 2 Sheets-Sheet 1

INVENTOR.
VIRGIL I. JOHANNES.
BY
*Frederick E. McMullen*
ATTORNEY.

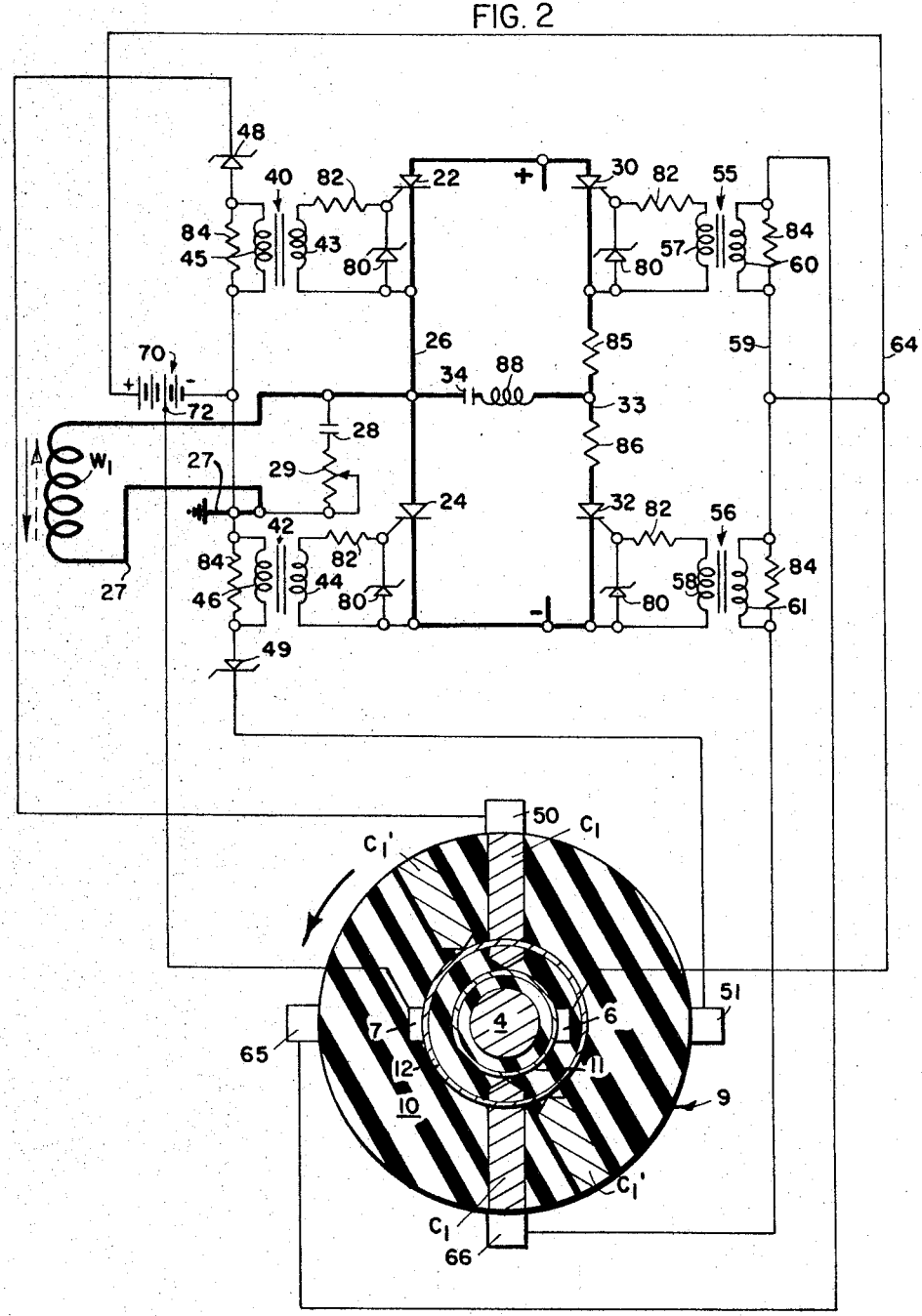

United States Patent Office 3,299,336
Patented Jan. 17, 1967

3,299,336
DYNAMOELECTRIC MACHINE HAVING SOLID
STATE COMMUTATION
Virgil I. Johannes, Plainfield, N.J., assignor to Carrier
Corporation, Syracuse, N.Y., a corporation of Delaware
Filed June 9, 1964, Ser. No. 373,718
3 Claims. (Cl. 318—138)

This invention relates to dynamoelectric machines, and more particularly to motors intended for operation on direct current.

In dynamoelectric machines, the magnetic field established by the rotating portion of the machine is held in predetermined operational relationship with the magnetic field established by the stationary portion of the machine. In the usual direct current motor, the predetermined operational relationship between the magnetic fields of the relatively movable rotor and stator is effected by continuously switching the energy input to the motor rotor. The usual method for performing the required switching operation is to employ an integral mechanical switching device, normally a pair of fixed brushes in contact with a rotating commutator.

The use of mechanical switching devices such as the aforementioned brush and commutator mechanism to switch energy input to the motor restricts both motor capability and application. In particular, the aforementioned brush and commutator mechanism, which carries the full energy input to the motor, is subject to arcing. Since brushes and commutator frictionally contact one another, their operational life is relatively short. And the use of a motor with an integral brush and commutator mechanism is restricted to environments not deleterious to the mechanism. For example, the ordinary direct current motor having a brush and commutator mechanism integral therewith is not available for hermetic motor-compressor units intended for use in refrigeration systems due to the adverse effect of the refrigerant atmosphere on the brush and commutator mechanism.

It is the principal object of the present invention to provide a unique operating arrangement for dynamoelectric machines.

It is a further object of the present invention to provide a new and improved motor suitable for use in refrigerant atmospheres.

It is an additional object of the present invention to provide a novel electronic control arrangement for a direct current motor.

It is a further object of the present invention to provide an improved switching arrangement for a direct current motor employing solid state switching devices.

This invention relates to a motor comprising in combination, a rotor, at least one energizing winding, a first pair of switching devices, one of the switching devices being adapted in response to a first control signal to connect the winding with the positive side of an energy source, a capacitor, the other of the first pair of switching devices being adapted in response to a second control signal to connect the winding with the positive side of the energy source through the capacitor, a second pair of switching devices, one of the switching devices being adapted in response to the first control signal to connect the winding with the negative side of the energy source, the other of the second pair of switching devices being adapted in response to the second control signal to connect the winding with the negative terminal of the energy source through the capacitor, and control means responsive to movement of the motor rotor adapted to provide the first and second control signals at one of the first and second pairs of switching devices in a determined sequence to energize and deenergize the winding. Other objects will be apparent from the ensuing description and drawings in which:

FIGURE 1 is a view of a motor employing applicant's novel operating arrangement and illustrating the rotor position sensing device; and FIGURE 2 is a circuit diagram of the operating arrangement for the motor shown in FIGURE 1.

Referring to the drawings, there is shown a direct current motor 1 having a relatively rotatable rotor or armature 2 and stator or field 3 inductively connected one to the other. In a preferred embodiment of the invention, rotor or armature 2 comprises a permanently magnetized member 5 having north-south poles mounted on rotatable output shaft 4. Stator 3 is provided with one or more winding $W_1$, $W_n$ suitably wound therearound operable on flow of current therethrough to establish north-south magnetic poles in a determined order and polarity relative to north-south poles of rotor 2 to effect relative rotation between rotor 2 and stator 3 of motor 1. Various stator winding arrangements, such as wave may be contemplated.

Referring particularly to FIGURE 2 of the drawings, applicant's novel operating arrangement for selectively energizing motor winding $W_1$ to effect rotation of armature 2 is therein shown. It is appreciated that the remaining motor windings $W_n$ are similarly controlled.

A pair of series connected switching devices 22, 24 are connected across the positive and negative terminals of a suitable source of primary direct current power, for example, a battery. Switching devices 22, 24 are preferably semiconductor type switching devices and preferably silicon-controlled rectifiers. The input electrode or anode of silicon-controlled rectifier 22 is connected to the positive side of the primary power source and the output electrode or cathode of silicon-controlled rectifier 24 is connected to the negative side of the primary power source. Line 26 connects the output electrode and input electrode of silicon-controlled rectifiers 22, 24 respectively to one terminal of winding $W_1$. The opposite terminal of winding $W_1$ is connected to common or ground line 27.

Silicon-controlled rectifier 22, when rendered operative in a manner to be more fully explained hereinafter, completes a circuit from the positive side of the primary power source through winding $W_1$ to line 27. Current flows in winding $W_1$ in the direction indicated by the solid line arrow. Similarly, silicon-controlled rectifier 24, when rendered operative, completes a circuit from the negative side of the primary power source through the winding $W_1$ to line 27. Current flows in winding $W_1$ in the direction indicated by the dotted line arrow.

A second pair of switching devices 30, 32 are connected in parallel with silicon-controlled rectifiers 22, 24 across the positive and negative sides of the primary power source. Switching devices 30, 32 are preferably silicon-controlled rectifiers. The input electrode or anode of silicon-controlled rectifier 30 is connected to the positive side of the primary power source and the output electrode or cathode of silicon-controlled rectifier 32 is connected to the negative side of the primary power source. Line 33 connects the output electrode of silicon-controlled rectifier 30 to the input electrode of silicon-controlled rectifier 32. Capacitor 34 is connected between lines 26 and 33.

While switching devices 22, 24, 30, 32 are, in a preferred embodiment of the invention, silicon-controlled rectifiers, other suitable switching devices, for example, transistors or thyratrons, may be contemplated.

Control transformers 40, 42 having secondary windings 43, 44 connected across the control electrode or gate and output electrode of silicon-controlled rectifiers 22, 24 respectively are provided. Primary windings 45, 46 of transformers 40, 42 respectively are connected through suitable unidirectional current control devices such as diodes 48, 49 respectively to contacts 50, 51 respectively of rotor position sensing device 9. Diodes 48, 49 prevent the flow of current through primary windings 45, 46 until a predetermined voltage, known as a breakdown voltage, is applied thereto as will be more fully explained hereinafter.

Control transformers 55, 56 having secondary windings 57, 58 respectively connected across the control electrode or gate and output electrode of silicon-controlled rectifiers 30, 32 respectively are provided. Primary windings 60, 61 of control transformers 55, 56 respectively are connected to contacts 65, 66 of rotor position sensing device 9. Lines 59, 64 connect primary windings 60, 61 to the positive terminal of a suitable source of secondary direct current energy, for example, battery 70.

Rotor position sensing device 9 preferably comprises a disc-like element 10 formed from a suitable nonconducting material having conductors $C_1$, $C_1'$, and fixedly attached to motor output shaft 4 for rotation therewith. Conductors $C_1$, $C_1'$, disposed in a predetermined angular relation to each other, terminate at the periphery of element 10. Conductor $C_1$ is electrically connected to the positive terminal of battery 70 by suitable means, for example, contacting brush 6 and slip ring 11. A source of direct current energy having a voltage less than the voltage across battery 70, which may for example comprise reduced voltage terminal 72 of battery 70, is connected to conductor $C_1'$ by means of contacting brush and slip ring 7, 12 respectively. Voltage at conductor $C_1'$ from terminal 72 of battery 70 is less than the breakdown voltage of diodes 48, 49, while the voltage at conductor $C_1$ is greater than the breakdown voltage of diodes 48, 49. Opposed pairs of contacts or brushes 50, 66 and 51, 65 slidably abut the outer periphery of element 10.

A unidirectional current control device, for example, a Zener or breakdown diode 80, is preferably connected across each of the secondary windings 43, 44, 57, 58 respectively of control transformers 40, 42, 55, 56. Resistor 82 may be connected between each of the transformer secondary windings 43, 44, 57, 58 and diode 80. Diodes 80, at a determined voltage, provide a path of current flow to regulate the voltage applied to the control electrodes of silicon-controlled rectifiers 22, 24, 30, 32. Additionally, diodes 80 provide a path for current flow following interruption of the circuit to primary windings 45, 46, 60, 61 in a manner to be explained hereinafter. Resistors 82 are suitably sized to regulate current in the control electrode circuit of silicon-controlled rectifiers 22, 24, 30, 32.

A resistor 84 is preferably connected across each of the primary windings 45, 46, 60, 61 of transformers 40, 42, 55, 56 respectively. Resistors 84 are suitably sized to provide a current path when the circuit between battery 70 and primary windings 45, 46, 60, 61 respectively is interrupted. A pair of resistors 85, 86 are provided in series with line 33 between the output electrodes of silicon-controlled rectifiers 30, 32. An inductor 88 is connected between capacitor 34 and resistors 85, 86. Capacitor 28 and resistor 29 are preferably connected in parallel with winding $W_1$ across lines 26 and 27. Resistors 85, 86; inductor 88; and capacitor 28 and resistor 29 are suitably sized to regulate the rate of change in voltage in line 26.

Assuming rotation of motor output shaft 4 in a counterclockwise direction, as shown by the arrow in FIGURES 1 and 2 of the drawings, with conductor $C_1$ in the solid line position opposite contacts 50, 66, a first circuit is completed from the positive terminal of battery 70 through brush and slip ring 6, 11, conductor $C_1$, contact 50, diode 48, and primary winding 45 of transformer 40 to common line 27. The build-up of current in primary winding 45 of transformer 40 results, through transformer action, in a pulse of current through secondary winding 43 of transformer 40 in the control electrode circuit of silicon-controlled rectifier 22 to place a positive potential on the control electrode thereof and render silicon-controlled rectifier 22 operative.

Silicon-controlled rectifier 22 completes a circuit from the positive side of the primary power source through silicon-controlled rectifier 22 to return line 27 to energize winding $W_1$. Current flow in winding $W_1$ is in the direction shown by the solid line arrow in FIGURE 2 of the drawings. It is understood that the potential of battery 70 is greater than the breakdown voltage of diode 48.

Contact 66, in series with the primary winding 61 of control transformer 56 and the positive terminal of battery 70, engages conductor $C_1$, also in series with the positive terminal of battery 70. There is accordingly no flow of current through the transformer primary winding 61.

Rotation of motor shaft mounted element 10 and accordingly movement of conductor $C_1$ interrupts the circuit between the positive terminal of battery 70 and primary windings 45, 61 of control transformers 40, 56 respectively. Silicon-controlled rectifier 22 remains operative and winding $W_1$ energized.

Rotation of element 10 brings conductor $C_1'$ opposite contacts 51, 65 to complete a circuit from reduced voltage terminal 72 of battery 70 through brush and slip ring 7, 12, conductor $C_1'$, contact 65, primary winding 60 of transformer 55 and lines 59, 64 to the positive terminal of battery 70. The build-up of current in primary winding 60 induces, by transformer action, a corresponding pulse of current through secondary winding 57 of transformer 55 to place a positive potential on the control electrode of silicon-controlled rectifier 30 and render silicon-controlled rectifier 30 operative.

Silicon-controlled rectifier 30 completes a circuit from the positive side of the primary power source through silicon-controlled rectifier 30, resistor 85, inductor 88, and capacitor 34 to return line 27 to discharge capacitor 34 through winding $W_1$. The discharge of capacitor 34 reduces current flow through silicon-controlled rectifier 22 to render silicon-controlled rectifier 22 inoperative and interrupt the circuit between the positive side of the primary power source and winding $W_1$. Capacitor 34 discharges and then recharges in reverse polarity. As capacitor 34 recharges, the flow of current through silicon-controlled rectifier 30 is reduced to render silicon-controlled rectifier 30 inoperative and interrupt the circuit between winding $W_1$ and the positive side of the primary power source.

With conductor $C_1'$ opposite contacts 51, 65, terminal 72 of battery 70 is connected through contact 51 to blocking diode 49. Blocking diode 49, sized to break down at a potential greater than that available at terminal 72 of battery 70, prevents flow of current through primary winding 46 of transformer 42.

Rotation of motor shaft 4 with element 10 fixed thereto brings conductor $C_1$ opposite contacts 51, 65 to complete a first circuit from the positive terminal of battery 70 through brush and slip ring 6, 11, conductor $C_1$, contact 51, diode 49, and primary winding 46 to return line 27. The build-up of current in primary winding 46 of control transformer 42 results, through transformer action, in a pulse of current through secondary winding 44 of transformer 42 in the control electrode circuit of silicon-controlled rectifier 24 to place a positive potential on the control electrode thereof and render silicon-controlled rectifier 24 operative. Silicon-controlled rectifier 24 completes a circuit from the return line 27 through silicon-controlled rectifier 24 to the negative side of the primary power source to energize winding $W_1$. Current flow through winding $W_1$ is in the direction shown by the dotted line arrow in FIGURE 2 of the drawings. It is understood that the potential of battery 70 is greater than the breakdown voltage of diode 49.

Contact 65, in series with the primary winding 60 of control transformer 55 and the positive terminal of battery 70, engages conductor $C_1$, in series with the positive terminal of battery 70. There is accordingly no flow of current through transformer primary winding 60.

Further rotation of motor shaft 4 and accordingly conductor $C_1$ interrupts the circuit between the positive terminal of battery 70 and primary windings 46, 60 of control transformers 42, 55 respectively. Silicon-controlled rectifier 24 remains operative and winding $W_1$ energized.

Rotation of sensing device element 10 brings conductor $C_1'$ opposite contacts 50, 66 to complete a circuit from the reduced voltage terminal 72 of battery 70 through brush and slip ring 7, 12, conductor $C_1'$, contact 66, primary winding 61 of transformer 56, and lines 59, 64 to the positive terminal of battery 70. The build-up of current in primary winding 61 induces, by transformer action, a corresponding pulse of current flow through the secondary winding 58 of transformer 56 in the control electrode circuit of silicon-controlled rectifier 32 to place a positive potential on the control electrode of silicon-controlled rectifier 32 and render silicon-controlled rectifier 32 operative. Silicon-controlled rectifier 32 completes a circuit from return line 27 through capacitor 34, inductor 88, resistor 86, silicon-controlled rectifier 32 to the negative side of the primary power source to discharge capacitor 34 through winding $W_1$. Discharge of capacitor 34 reduces current flow through silicon-controlled rectifier 24 to render silicon-controlled rectifier 24 inoperative and interrupt the circuit between winding $W_1$ and the negative side of the primary power source. Capacitor 34 discharges and recharges in reverse polarity. As capacitor 34 recharges, the flow of current through silicon-controlled rectifier 32 is reduced to render silicon-controlled rectifier 32 inoperative to interrupt the circuit between winding $W_1$ and the negative side of the primary power source.

Conductor $C_1'$ connects terminal 72 of battery 70 through contact 66 to blocking diode 48. Blocking diode 48, sized substantially equal to blocking diode 49, prevents flow of current through the primary winding 45 of transformer 40.

It is understood that motor windings $W_n$ are each provided with similar control circuitry as that heretofore described for motor winding $W_1$. Where additional windings $W_n$ are employed, rotatable element 10 of rotor position sensing device 9 may be provided with additional pairs of conductors $C_n$, $C_n'$ for each of windings $W_n$. Conductors $C_n$, $C_n'$ are disposed on element 10 in predetermined angular relationship to each other and to conductors $C_1$, $C_1'$.

Applicant's unique static type operating arrangement for dynamoelectric machines dispenses with the usual mechanical switching devices such as the integral brush and commutator of direct current motors having full energy input to the motor thereacross.

While I have described a preferred embodiment of my invention, it will be understood that my invention is not limited thereto since it may be otherwise embodied within the scope of the following claims.

I claim:
1. In a motor having a rotor and at least one energizing winding, the combination of a first pair of switching devices, one of said switching devices being adapted in response to a first control signal to connect said winding with the positive side of an energy source, a capacitor, the other of said first pair of switching devices being adapted in response to a second control signal to connect said winding with the positive side of said energy source through said capacitor, a second pair of switching devices, one of said switching devices being adapted in response to said first control signal to connect said winding with the negative side of said energy source, the other of said second pair of switching devices being adapted in response to said second control signal to connect said winding with the negative terminal of said energy source through said capacitor, and control means responsive to movement of said motor rotor adapted to provide said first and second control signals at one of said first and second pairs of switching devices in a determined sequence to energize and deenergize said winding.

2. A motor according to claim 1 including means blocking application of said second control signal to said one of each of said first and second pairs of switching devices.

3. In a direct current motor having a rotor and at least one energizing winding, the combination comprising a first switching device having an input electrode connected to the positive terminal of an energy source and an output electrode connected to said winding, control means for actuating said first switching device at a predetermined first motor rotor position to energize said winding, a second switching device having an input electrode connected to the positive terminal of said energy source, a capacitor connected between said winding and the output electrode of said second switching device, said control means actuating said second switching device following determined movement of said motor rotor from said predetermined first position to discharge said capacitor through said winding thereby reducing flow of current through said first switching device to render said switching device inoperative, a third switching device having an input electrode connected to said winding and an output electrode connected to the negative terminal of said energy source, said control means actuating said third switching device at a predetermined second motor rotor position to energize said winding, and a fourth switching device having an input electrode connected to said capacitor and an output electrode connected to the negative terminal of said energy source, said control means actuating said fourth switching device following determined movement of said motor rotor from said predetermined second position to discharge said capacitor through said winding thereby reducing flow of current through said third switching device to render said third switching device inoperative.

No references cited.

ORIS L. RADER, *Primary Examiner.*

G. SIMMONS, *Assistant Examiner.*